Patented Feb. 20, 1951

2,542,721

UNITED STATES PATENT OFFICE 2,542,721

FIRE RETARDANT WATERPROOF COATING

Robert M. Stafford, Somerville, N. J., assignor to Johns-Manville Corporation, New York, N. Y., a corporation of New York No Drawing. Application January 25, 1947, Serial No. 724,465

2 Claims. (Cl. 106—15)

This invention relates to a protective coating composition, and more particularly to a coating having waterproofing and fire-retardant properties adapting it for use on weather exposed structural surfaces such as building roofs.

An object of the invention is to provide an improved coating composition which is weather durable and waterproof and which possesses fire-retardant properties.

Another object is to provide a water and fire-resistant coating composition having a consistency suitable for application by brushing, spraying or dipping, and which may therefore be classified as a paint or painting composition.

A further object is to provide a suitable protective fire-retardant coating for the weather exposed surfaces of asphalt saturated fibrous felt sheet surface coverings.

Asphalt saturated felted asbestos fiber sheets are widely used for forming building roofs, the sheets being laid on a sloping roof with either horizontal or vertical laps, and with the lap joints cemented with a cement containing asphalt as a major ingredient. A roof of this type is waterproof and has good aging qualities and weather resistance, but does not possess adequate fire resistance, even though asbestos may be its major fiber ingredient. Under the heat of a flame or burning brand applied to the top surface of such lapped saturated felt sheets, molten asphalt exudes from the sheets and particularly from the lap-joint cement, and the flow of asphalt down the slope of the roof feeds the flame and tends to spread the flame.

A particular object is to provide a paint embodying a solvent reduced bituminous vehicle, dry solvent-free coatings of which are effective for substantially preventing exudation and flow of molten asphalt and spread of flame at a flame exposed top surface of a built-up roof of lapped and lap-cemented asphalt saturated roofing sheets.

A further object is to provide an economical waterproof and fire-retardant coating which is sufficiently flexible at low temperatures to resist cracking, and which has a high melting point and good flow resistance at high temperatures.

Important features of the present coating composition are that it is applied as a solvent reduced paint; that it dries by evaporation of a volatile solvent at normal atmospheric temperature; that its body or binder is an asphalt or equivalent bituminous material; and that its flame and fire resisting properties are imparted by minor proportions by weight of finely divided flame resistant layer forming filler materials.

With the above objects and features in view, the invention consists in the improved fire-retardant waterproof coating composition which is hereinafter described and more particularly defined by the accompanying claims.

In the form in which it is applied as a coating the present paint comprises a solvent reduced bitumen as the binder element or vehicle, and exceedingly light-weight, bulky filler material comprising heat expanded volcanic glass, as the principal fire-retardant. Applied coatings, after drying, comprise a major proportion of water impenetrable bitumen throughout which is distributed sufficient expanded volcanic glass filler material to permit the coating to dry by escape of vaporized solvent and to impart heat insulating and flame retarding properties to the coating.

The coating composition or paint is prepared by thoroughly mixing the solvent reduced bitumen and expanded volcanic glass granules. The bitumen is preferably an asphalt, and the volcanic glass granules are dispersed uniformly through the solvent reduced bituminous vehicle. The bitumen is the principal waterproof body and binder element of the paint, and may be either natural or artificial asphalt or other suitable bitumen or equivalent, such as coal tar pitch, wood tar pitch or any heavy fatty acid pitch.

A suitable volcanic glass is one having a high proportion by weight (65–75%) of molecular silica in its composition, together with a substantial amount (2–6%) of combined water. Such volcanic glasses, when reduced to a finely divided form and when exposed to temperatures of the order of about 2000° F., undergo expansion of the particles to many times their original size, to produce a granular material which is cellular and extremely light in weight. For the purposes of the present invention the crude volcanic glass is preferably ground to a size which, after heat expansion, yields cellular granules of 3–12 lbs. per cubic foot density and classifying as to size by completely passing a standard 35-mesh screen and being completely retained on a standard 200-mesh screen.

The finely divided cellular volcanic glass granules are mixed with the solvent reduced bituminous vehicle in minimum amount of the order of about 5% of the dry bitumen content of the vehicle, by weight. The proportions of the cellular volcanic glass employed may vary substantially, depending on the amounts of other inorganic filler materials incorporated in the coating composition, and on the consistency and thickness of the coating to be applied. Coatings may generally incorporate between 5% and 30% of the cellular volcanic glass granules by weight of the dry asphalt content.

A suitable formula for the present paint employs heat-expanded cellular perlite as the chief flame-retardant filler material, and cutback asphalt as the vehicle. The asphalt should have a softening point of at least about 170° F., and the paint formula may include 45–50% by weight of asphalt and 30–35% asphalt solvent. The paint may incorporate other inorganic material, such as short asbestos fibers and zinc borate or equivalent metal borate fireproofing material. The paint may also contain a foaming agent in powder form such as borated Vinsol resin, which under the heat of a flame causes the coating to foam and form a porous voluminous insulating structure. Vinsol resin is a dark colored pine resin which is insoluble in petroleum hydrocarbon such as the paint solvent and has a melting point of 250° F. It is a thermoplastic pine wood pitch which is free of rosin and of gasoline soluble materials. The borated resin is formed by incorporating borax or other boric acid salts.

Perlite is a volcanic glass of high silica content (65–73% silica) and which contains 12–16% alumina, 6–7% alkali oxides, 2½–5% alkaline earth oxides, and 2–6% combined water. Perlite occurs naturally as dense, onion-like nodules having a concentric shell structure and concoidal fracture. When finely divided natural dense perlite is subjected to heat at a temperature of approximately 2000° F., the particles expand to form minute cellular granules, as a result of liberation of combined water at the high temperatures. Suitable expanded granules for use as a flame-retardant filler of the present coating generally classify as to size within the range of 35–200 mesh, and as to mass density within the range 3–12 pounds per cubic foot. There are two general types of cellular structure in the expanded perlite. Some of the granules are of a closed cell type in which an air cell is completely enclosed by a glass shell, while other particles are of an open cell type in which the closed cell has been ruptured during the heating treatment. The closed cell type of heat-expanded perlite granules have a greater bulking effect when incorporated in the paint, and apparently impart maximum fire-retardant properties.

No other inorganic particle has been found which imparts fire-retardant properties in a degree approximating those obtained by the use of heat-expanded perlite or equivalent volcanic glass granules. Other inorganic filler materials which have been tried in the place of the expanded perlite include pulverized limestone, slate dust, fly ash, asbestos fiber, and finely divided diatomaceous silica. Diatomaceous silica particles are the most efficient of the tested substitutes for the heat-expanded perlite, but coatings of a paint incorporating diatomaceous silica particles as the flame-retardant element were found to break down after flame exposure over periods in excess of about 30 minutes in length.

Under the heat of a flame a dried solvent free bituminous coating containing 5% or more by weight of heat expanded volcanic glass granules or particles develops an insulating layer or crust which is incombustible and which protects the underlying roof against the flame, while allowing the surface film of asphalt in the coating to burn and carbonize. The insulating layer thus formed by the cellular volcanic glass granules apparently retains at least some of the trapped air of its original structure, and incorporates any carbonized coke formed by partial combustion of the asphalt in such a way as to prevent complete combustion of the residual carbon. Its extremely low density and buoyancy tends to cause migration of the cellular volcanic glass or perlite to the top surface of the applied coating, where it functions most effectively as heat and flame insulating material. It appears that under the heat of the flame the glass shells of the expanded perlite granules undergo some softening and caking coalescence of adjacent granules to form a more or less continuous flame impermeable insulating mat, and that air occluded in the granules and liberated by heat, assists in promoting some foaming of the coating.

In addition to expanded volcanic glass granules the present paint advantageously incorporates 3–5% by weight of zinc borate or magnesium borate. A coating incorporating zinc borate, under exposure to flame heat at temperatures of 800° F. more or less, develops rapid conversion of the zinc borate to a surface layer of tough slag, and the slag thus formed is particularly effective for retarding the exudation flow of molten asphalt from the roof laps down the slope of the roof surface. The borate slag also forms a protective insulating coating for the lap cement, against flame contact.

In addition to a foam producing agent the paint composition may to advantage incorporate small amounts of agents which give off flame smothering gases. Suitable gas evolving agents of this type are highly chlorinated paraffin or naphthalene compounds, or antimony trioxide.

Another advantageous ingredient of the present coating or paint composition consists of short asbestos fibers. Such fibers are advantageously added in amounts of 6–12% by weight of dry asphalt content of the coating, for the purpose of raising the high temperature flow resistance of the coating and to impart toughness to the burned coating film to thereby promote formation of a strong continuous flame and combustion resistant mat protecting the underlying roof. The strength and continuity of a coating incorporating such short asbestos fibers also contributes to the effectiveness of any slag or insulating layers developed under flame heat, which layers function to trap molten bitumen and prevent its flow down the slope of the roof. Thus the asbestos fibers serve to knit together and reinforce the unburned coating and also to reinforce and knit toegther the burned or partially burned coating to form a continuous strong mat.

A suitable paint formula is one containing approximately 48% by weight of asphalt of about 170° F. softening point, 32% asphalt solvent such as petroleum naphtha, 12% short fiber asbestos, 3–5% heat-expanded perlite, and 5–3% zinc borate. A paint of this formula has a heavy brushing consistency suitable for forming thick films with a coverage of about 50 square feet per gallon. The paint can be stored in cans, and requires only slight stirring to provide a smooth, homogeneous mixture. Since the base vehicle is a bitumen such as asphalt, the paint is compatible with the asphalt saturant of the sheet roofing to which the paint is most advantageously applied. Since the asphalt vehicle comprises the major ingredient of the present composition, it imparts to the paint and resulting coatings suitable properties of adhesiveness, flexibility, water- and weather-resistance, and aging durability over long periods of weather exposure. The resulting coatings retain flexibility and resist cracking under prolonged exposure to freezing temperatures, and while the asphalt vehicle will burn and carbonize under the heat of a flame, the presence of 15 to 30% by weight of inorganic fillers including cellular perlite is effective for preventing rapid flame spread or destructive disintegration of the underlying sheet roof.

The invention which has been thus described by detailed example is not limited as to such details, and it is to be understood that variations, changes and modifications are contemplated within the scope of the invention as defined by the following claims.

What I claim is:

1. A weather proof and fire-retardant coating consisting essentially of asphalt having a softening point of at least about 170° F., and finely divided filler material uniformly distributed throughout said asphalt and comprising 5–30% by weight of cellular perlite having a density within the range of 3–12 pounds per cubic foot.

2. A bituminous paint comprising 45–50% by weight of asphalt of about 170° F. softening point, 30–35% by weight of asphalt solvent, approximately 12% short fibered asbestos, approximately 3–5% heat-expanded perlite, and approximately 5–3% zinc borate, the solvent being present in sufficient proportion to adapt the paint for application by brushing at normal air temperature.

ROBERT M. STAFFORD.

REFERENCES CITED

The following references are of record in the file of this patent:

UNITED STATES PATENTS

| Number | Name | Date |
|---|---|---|
| 1,706,733 | Hopkins | Mar. 26, 1929 |
| 1,743,744 | Winkelmann | Jan. 14, 1930 |
| 2,131,085 | Anderton | Sept. 27, 1938 |
| 2,226,348 | Raab | Dec. 24, 1940 |
| 2,233,259 | Harth | Feb. 25, 1941 |
| 2,385,437 | Fasold et al. | Sept. 25, 1945 |
| 2,396,910 | Zaisser | Mar. 19, 1946 |
| 2,413,516 | Pratt et al. | Dec. 31, 1946 |

FOREIGN PATENTS

| Number | Country | Date |
|---|---|---|
| 470,271 | Great Britain | Aug. 12, 1937 |

OTHER REFERENCES

Compressed Air Magazine, vol. 47, 1942, page 6694.

Condensed Chem. Dictionary, 3rd edition, 1942, page 533.

University of Arizona Bulletin, vol. 15, No. 4, October 1944, page 3.

Bureau of Mines Circular I. C. 7364, August 1946 (Perlite, Source of Synthetic Pumice, 11 pages).